United States Patent [19]

Lord

[11] Patent Number: 5,015,187
[45] Date of Patent: May 14, 1991

[54] HELICOPTER REMOTE CONTROL SYSTEM

[75] Inventor: Douglas W. Lord, Orlando, Fla.

[73] Assignees: Byron Hatfield; Ken Hudson, both of Orlando, Fla.

[21] Appl. No.: 486,170

[22] Filed: Feb. 28, 1990

[51] Int. Cl.$^5$ .............................................. G09B 9/00
[52] U.S. Cl. .................................... 434/33; 358/109; 244/190; 244/17.23; 244/17.13; 364/462; 434/14
[58] Field of Search ............. 434/33, 37; 272/DIG. 5, 272/DIG. 6; 244/17.23, 17.25, 190, 17.13; 358/109, 194.1, 108; 446/232; 364/462, 424.02; 340/825.69, 825.72, 870.07; 455/98, 39

[56] References Cited

U.S. PATENT DOCUMENTS

| | | | |
|---|---|---|---|
| 3,217,097 | 11/1965 | Pauli et al. | 358/109 X |
| 3,226,059 | 12/1965 | Paterson et al. | 358/109 X |
| 3,241,146 | 3/1966 | Petrides | 358/109 X |
| 3,634,622 | 1/1972 | Wheeler | 358/109 X |
| 4,163,535 | 8/1979 | Austin | 244/17.23 |
| 4,299,483 | 11/1981 | Grove et al. | 358/109 X |
| 4,478,379 | 10/1984 | Kerr | 244/17.23 X |
| 4,729,737 | 3/1988 | Reagan et al. | 434/14 |
| 4,748,569 | 5/1988 | Gordon | 364/462 |
| 4,752,791 | 6/1988 | Allred | 358/109 |
| 4,818,990 | 4/1989 | Fernandes | 340/870.07 |

Primary Examiner—Richard J. Apley
Assistant Examiner—Glenn E. Richman
Attorney, Agent, or Firm—William M. Hobby, III

[57] ABSTRACT

A remote controlled helicoper having a video radio frequency link to a fixed control location has a video camera with a field of view including the terrain forward of the helicopter, an airspeed display, a relative wind direction indicator, and a pitch indicator. A video monitor at the fixed location displays received video signals of the terrain, airspeed, relative wind direction and pitch permitting control of the helicopter over a radio link from the fixed location to the helicopter. The system provides training, experience, and practice in operation of the helicopter.

12 Claims, 3 Drawing Sheets

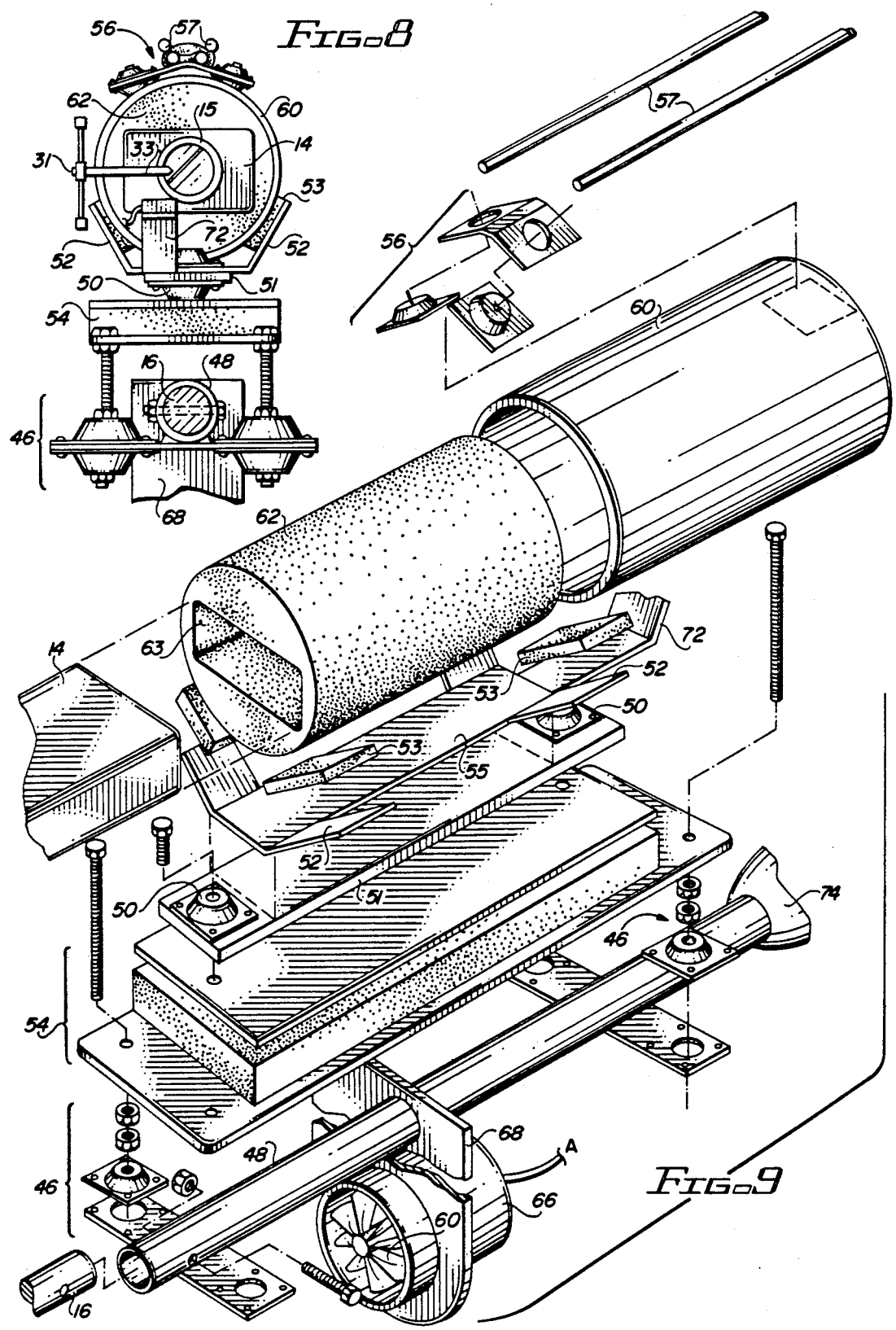

HELICOPTER REMOTE CONTROL SYSTEM

BACKGROUND OF THE INVENTION

1. Field of the Invention

The present invention relates to remotely controlled model aircraft such as helicopters, and more particularly to a remote control system for a miniature helicopter which provides realistic training and practice for helicopter pilots and which permits controlling a small scale helicopter out of line of sight range.

2. Brief Description of the Prior Art

Training of helicopter pilots is difficult and expensive, and has many attendant risks due to the relative complexity of operations required during flying of the helicopter. There have been attempts in the prior art to teach helicopter pilots with simulators and the like to avoid using actual helicopters for in-flight instruction, especially in the early phases of training. It is also desirable to use small, unmanned helicopters as remote controlled hovering platforms during surveillance and similar operations. Thus, there is a need for a system which will permit a person to operate all the necessary controls of a small scale helicopter from a fixed location. It is also desirable to be able to control the helicopter when it is out of sight of the operator, and, therefore, a display is required to inform the operator of the helicopter attitude and environment.

Spoolcraft U.S. Pat. No. 4,464,116 discloses a system having a radio controlled, free-flying scale model of a helicopter and a fixed flight station which simulates the helicopter cockpit. However, this system is limited to control of the scale model only when it is in full sight of the operator. U.S. Pat. No. 3,548,518 teaches a similar system in which the scale model helicopter is connected to the flight control station by a tethered umbilical cord. Other U.S. patents related to this area of the art include: U.S. Pat. Nos. 2,711,594; 4,120,699; 2,916,832; 3,225,458; and 2,958,141.

SUMMARY OF THE INVENTION

The present invention is a system utilizing remote radio control of a scale model of a helicopter. The system includes a video display screen at the control position which receives information from a television camera in the nose of the helicopter. The video display provides the operator with a view of the terrain and other objects within the view of the television camera. Also displayed on the screen are indications from devices carried on the helicopter which indicate the attitude of the helicopter. The remote control position of the system includes standard helicopter controls which the operator may then control to provide the desired maneuvers of the helicopter.

The helicopter includes a radio transmitter which may operate in the VHF, UHF or microwave region for transmitting video signals back to the control position. To provide attitude information to the operator, the helicopter includes a directional reference pointer aligned with the longitudinal axis of the helicopter and projecting from the nose. At the outer end of the pointer, a first wind vane is mounted vertically and includes a vane at the back end area which will respond to the horizontal components of any air passing the vane. The second wind vane is mounted horizontally such that the vane portion will respond to vertical components of the air flow. For example, when a helicopter is flying straight and level with no lateral drift, both vanes will be aligned with the pointer. The pointer and the wind vane are within the view of the camera such that the operator sees these elements on the display screen. If the helicopter nose is raised, for example, the horizontal wind vane will indicate a nose-up position by weather-cocking to an angle with respect to the pointer. Similarly, if the helicopter is yawing or drifting laterally, the vertical wind vane will be displaced. The movements of the vanes may be noted on the display screen by the operator.

To indicate airspeed, an airspeed turbine is suspended below the fuselage of the helicopter which produces an electrical output proportional to airspeed. It is connected to an electronic detector which displays the airspeed on an analog LED readout. The LED readout display is mounted such that it is in the field of view of the television camera lens and will therefore appear on the operator's display screen. For example, the display may show up in the lower right hand corner of the display. To indicate pitch attitude of the helicopter, a dynamically balanced rod is pivoted laterally and includes an indicator pointer at its forward end. The pitch indicator rod is positioned such that the indicator pointer is within the field of the tv camera lens and will be centered vertically at one side thereof when the helicopter is in level flight with no pitch. When the helicopter is nose-down or nose-up, the balanced pitch indicator will remain essentially parallel with the ground and will therefore appear to move upward or downward along the edge of the display screen. Calibration marks may be provided to indicate the degree of pitch. If desired, an altimeter and a compass may be included in the helicopter and digital readouts disposed within the camera field of view.

The television camera is selected to have a depth of field sufficient for the nearby control indicators to be in focus as well as the terrain out to the horizon.

As will now be recognized, the scale helicopter mounted television camera in the aircraft and the video display at the control point will provide the operator with all of the real-time information needed to control the scale helicopter, such as attitude, airspeed, and apparent wind direction.

It is therefore a principal object of the invention to provide a helicopter training and control system which will permit a person to obtain experience and practice in operating the controls of a helicopter without the attendant costs and risks of actual flight in a fullsize machine.

It is another object of the invention to provide a remote controlled helicopter having a return communication link which will supply visual information to the operator for controlling the helicopter without a requirement of telemetry signals.

It is still another object of the invention to provide a remotely controllable miniature helicopter and control system which will provide the operator with a visual display of the attitude of the helicopter as well as the terrain over which the scale helicopter is flying.

It is yet another object of the invention to provide a remote controlled miniature helicopter that will transmit control and video information back to the operator including a view of the terrain and objects within view of the helicopter to permit surveillance and inspection of the area.

It is another object of the invention to provide a remotely controllable miniature helicopter having a small television camera mounted in the nose with the lens directed forward and to provide a directional reference pointer within the view of the television lens for supporting relative wind direction indicators.

These and other objects and advantages of the invention will become apparent from the following detailed description when read in conjunction with the drawings.

BRIEF DESCRIPTION OF THE DRAWINGS

FIG. 8 shows a front view of the camera mount installation of FIG. 7; and

FIG. 9 shows an exploded perspective view of the camera mount of FIGS. 7 & 8.

DETAILED DESCRIPTION OF THE PREFERRED EMBODIMENT

Figure 1:
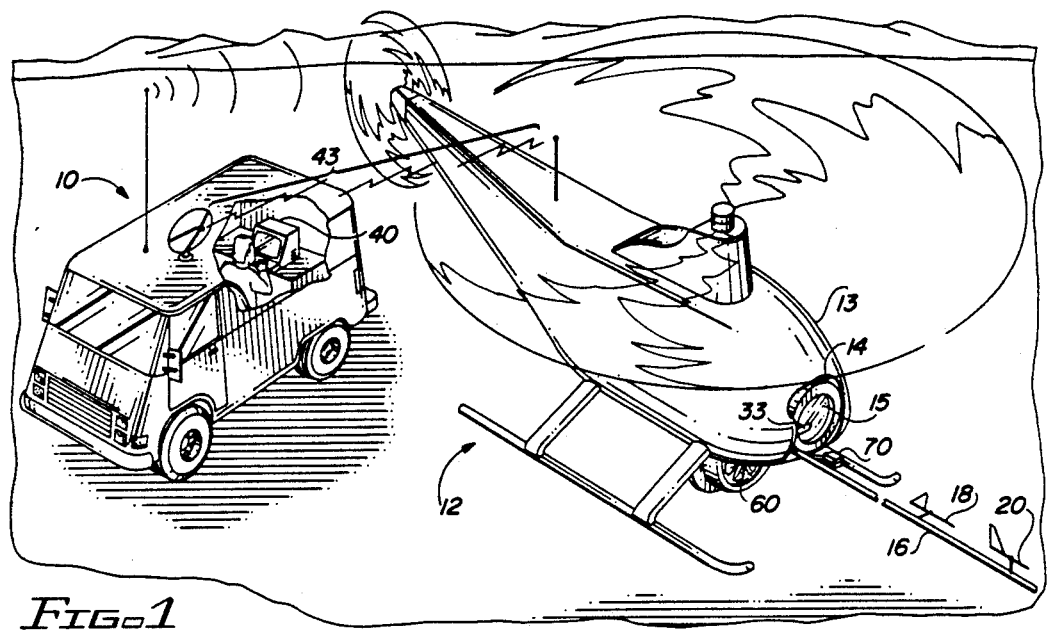
FIG. 1 is a stylized perspective view of a scale helicopter of the invention being controlled from a fixed position in a van in which the van is cut away to show the operating position.

Referring to FIG. 1, a perspective view of a scaled down model helicopter 12 is shown in flight. A control van 10 is indicated, showing in cutaway view, a control position and an operator. Helicopter 12 is mechanically stabilized by use of fly-bar weights, heavy rotor blades and the like. The various helicopter controls are remotely operated from the control van 10 by any suitable remote control system. For example, Kendal, Jr., et al. in U.S. Pat. No. 3,096,046, describe a typical helicopter remote control system.

In accordance with the invention, a television camera 14 having lens 15 is disposed in the fuselage 13 of helicopter 12. As will be seen, camera lens 15 is directed forward from the helicopter and is selected to have a large depth of field. That is, objects very close to the lens are in focus while the terrain, buildings, and other objects out to the horizon are also in focus.

A directional reference pointer 16 extends along the longitudinal axis of fuselage 13 and is preferably formed of fiberglass. The length of pointer 16 may be in the range of 30 inch to 50 inch for a 60 inch rotor diameter. As will be discussed hereinafter, pointer 16 provides a directional reference for the operator. Pointer 16 also serves as a mount for apparent wind direction indicators 18 and 20 attached at the forward end of pointer 16. An air speed indication is provided by an electrical turbine generator 60 mounted to extend below fuselage 13 and a remote readout, described below. A pitch indicator 33 provides information concerning the pitch of helicopter 12. All attitude and other information necessary for flying helicopter 12 is transmitted from the helicopter to the control position, for example van 10, and such information is displayed on a display terminal 40. The video link 43 between the helicopter to the control position is selected such that operation of helicopter 12 may be effected at distances of 3 to 40 miles, dependant upon terrain, and control system frequency and power. Advantageously, video link 43 permits control when helicopter 12 is out of visual range of the operator.

Figure 2:
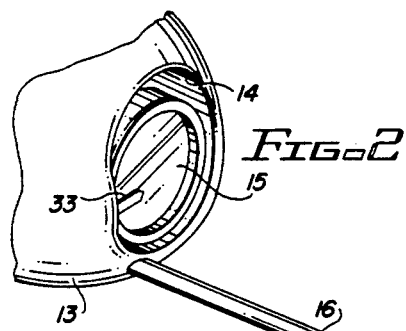
FIG. 2 is a view of the directional reference pointer arrangement at the nose of the helicopter of FIG. 1.

Turning now to FIG. 2, details of the wind indicators 18, 20, air speed readout 70, and pitch indicator 33 are shown. Wind indicator 20 is pivoted horizontally and is mounted vertically above and at an outer end of pointer 16. Wind indicator 20 is a balanced wind vane which will weathercock into the direction of the airflow past the vane portion thereof. Wind indicator 18 is similar to indicator 21 and is pivoted vertically so as to weathercock in accordance with the vertical component of air passing the vane portion thereof. Indicators 18 and 20 are within the field of view of lens 15 of TV camera 14 and will therefore appear on display 40. LED readout 70 is mounted on bracket 72 in the field of view of camera 14.

Figure 4:
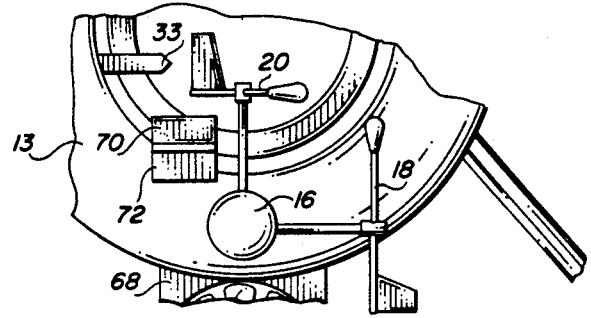
FIG. 4 is an enlarged view of a portion of FIG. 3 showing the wind direction vanes in displaced positions.

Wind indicators 18 and 20 in FIG. 2 are shown in a neutral position in FIG. 2; that is, the airflow is parallel with pointer 16 and has no vertical or horizontal component thereof. However, as a vertical or horizontal component of the airflow occurs, vanes 18 and 20 are free to move in the directions shown by the arrows. FIG. 4 shows an example in which there is a horizontal component of airflow from left to right and a vertical component downward thereby displacing indicators 18 and 20. This may occur for example when there is starboard yaw and helicopter 12 is climbing.

Figure 3:
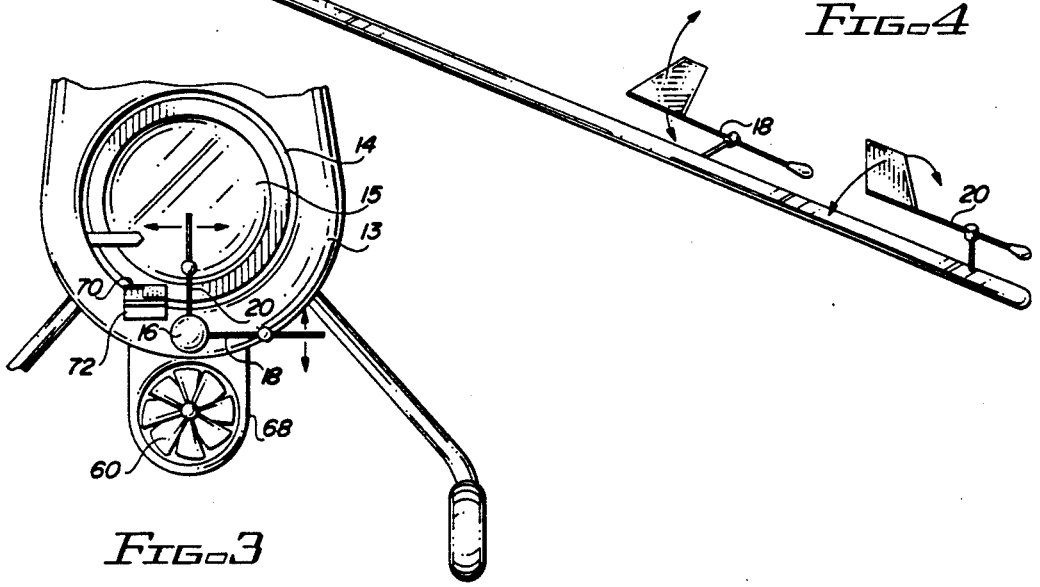
FIG. 3 is a front plan view of a portion of a helicopter showing the wind direction vanes and the air speed turbine.

FIG. 3 is a front view of fuselage 13 showing air speed turbine 60 in mount 62. Turbine 60 produces an electrical output proportional to the air speed of the airflow through the turbine. This electrical output is connected to LED readout 70 shown in FIG. 2 attached to bracket 72 within the field of view of lens 15. Wind turbine air speed device 60 and readout 70 may be of the type manufactured by Davis Instrument Company, or similar known devices. As will be understood, readout device 70 will produce a digital readout of the indicated air speed. The readout will be picked up by television camera 14 and transmitted to the control position to be displayed on display 40. Pitch indicator pointer 33 extends into the field of view of lens 15 and will move upward and downward in accordance with the pitch attitude of helicopter 12. As may be noted in FIG. 4, helicopter 12 is shown to be in a climbing attitude and therefore pitch indicator 33 has moved downward from its level position.

Figure 5:
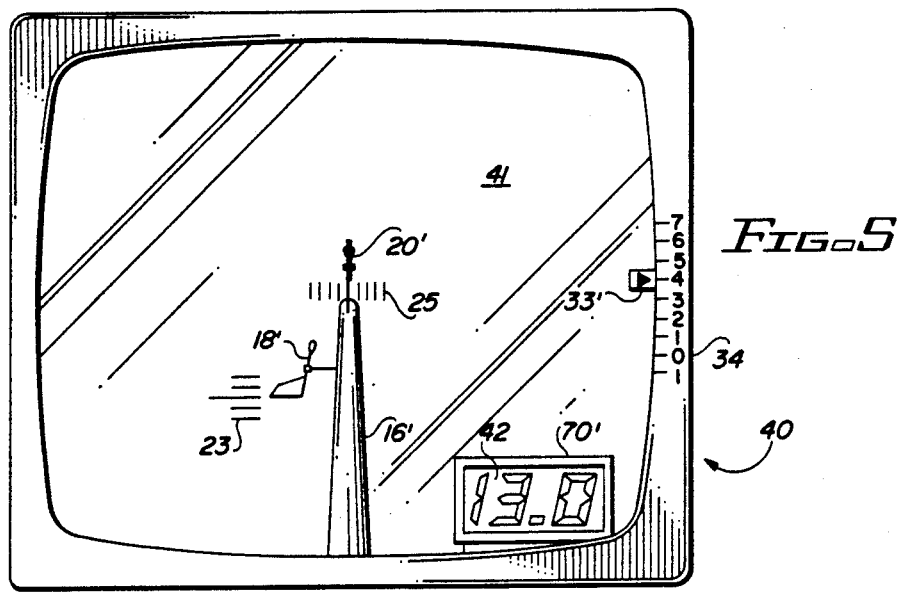
FIG. 5 illustrates the display screen of the control position of FIG. 1 for the relative wind indicators of FIG. 3 with an exemplary air speed and pitch.
Figure 6:
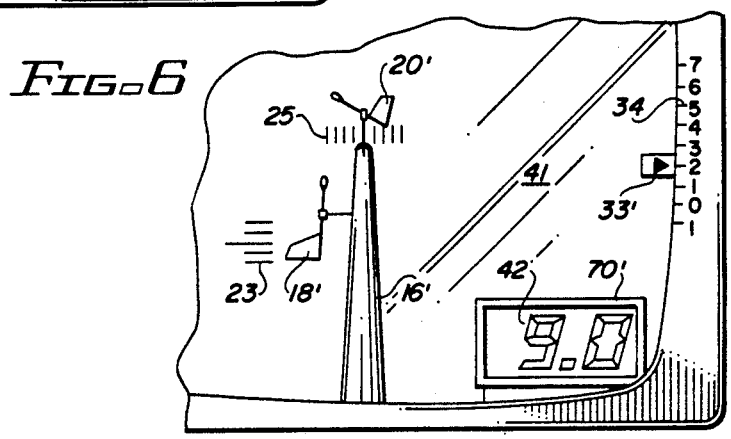
FIG. 6 shows the screen of FIG. 5 for the attitude of the helicopter of FIG. 4 in which yaw is present, a reduced air speed is shown, and a reduced pitch is shown.

FIG. 5 illustrates display terminal 40 at the operator control position. Screen 41 of the display may be a standard television cathode ray tube screen. The images transmitted from the helicopter 12 appearing on screen 41 will be referred to by reference numerals having a prime. Directional reference pointer 16' is seen and appears along a vertical centerline of the screen 41. Pointer 16' appears to the operator in perspective view as having a marked taper. At the outer end of the image pointer 16', the horizontal apparent wind indicators 20 and 18' are seen in their neutral position representing the condition illustrated in FIGS. 2 and 3 for straight and level flight with no apparent wind. To assist the operator, wind direction marks 23 and 25 may be provided on the screen 41. Pitch indicator 33' shows a nose-down condition in straight and level flight of helicopter 12. Indicia 34 indicate that the angle of pitch is approximately 4°. In the lower right hand corner of screen 41, the image 70' of air speed readout indicator 70 appears with the LED readout 42 indicating 13 knots forward speed. Similarly, FIG. 6 indicates the attitude of helicopter 12 indicated in FIG. 4. The craft is climbing with its nose-down at 2°, with starboard yaw and a 9 knot indicated air speed. The relative wind due to the climb and starboard yaw condition is shown by the wind indicator images 18' and 20'.

Figure 7:
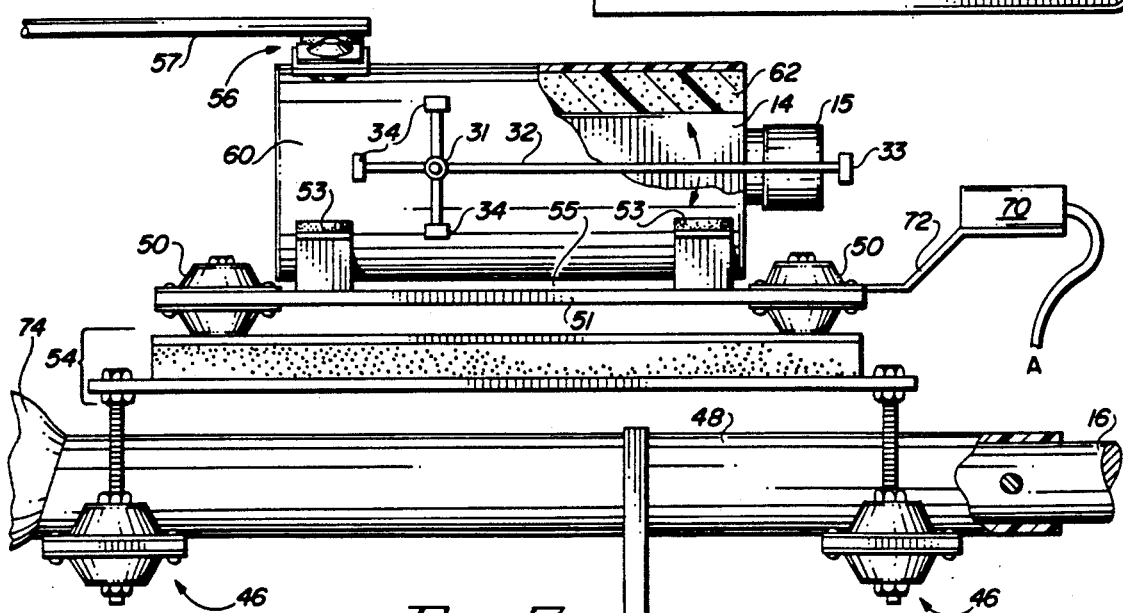
FIG. 7 shows a portion of a structural frame member of the helicopter having a television camera, the air speed turbine of FIG. 3, and the directional reference pointer mounted thereto.

Having discussed the mode of operation of the system of the invention, the helicopter structure for the system will now be described. In FIG. 7, details of the television camera mount are shown. As will be understood, it is necessary to provide isolation of the camera from vibration which occurs in the flight of helicopter 12. Therefore, a novel multiple shock mounting system is utilized. The camera is supported by a helicopter structural member 48 within the lower edge of the helicopter fuselage 13. As will be noted from FIG. 7, structural member 48 extends from a portion of the internal framework 74 of the fuselage 13. Referring to FIGS. 7, 8 and 9, a first isolation stage is provided by a pair of lower isolation mounts 46, shown in exploded view in FIG. 9, which support an isolation plate 54 having a foam rubber core between a pair of wooden plates. A second isolation mount comprising a wooden plate 51 and shock absorbers 50 is attached to isolator 54. A camera mounting plate 55 includes cradle elements 52 and foam rubber blocks 53. An outer fiberglass camera housing 60 is bonded to pads 53 which are bonded to cradle elements 52. A foam rubber camera support 62 fits into housing 60 and includes a central cutout portion 63 which accepts camera body 14. A shock absorber unit 56 is cemented to the top surface of housing 60 as best seen in FIGS. 7 and 8. A pair of fiberglass rods 57 are attached to the upper portion of shock absorber assembly 56 and secured with silicone cement as seen in FIG. 8. The other ends of fiberglass rods 57 are attached to the fuselage framework not shown.

As will be recognized, the multiple shock absorbing elements effectively isolate camera 14 from vibration of the fuselage framework. Fuselage framework member 48 used to support camera 14 has an open forward end thereof adjacent the nose of fuselage 13. Directional reference pointer 16 is inserted into the forward end of fuselage element 48 and secured by a suitable fastener. Camera mounting plate 55 includes an extension 72 forward which is utilized to mount air speed indicator readout 70. Air speed turbine 60 in housing 66 is disposed in mounting bracket 68 attached to fuselage framework element 48. Output leads from air speed turbine 60 are connected to indicator readout 70 as indicated by the letter A.

Details of the pitch indicator are shown in FIGS. 7 and 8. A fiberglass rod 32 is attached by pivot 31 to the side of camera housing 60. Pointer 33 is attached to the forward end of rod 32. Indicator 33 and rod 32 are counterbalanced by weights 34 such that under normal conditions, rod 32 is level and parallel with the ground. Thus, when the helicopter is in a nose-up or nose-down attitude, indicator 33 will be above or below the centerline of lens 15. Weights 34 also serve to dampen any movement of rod 32, such as during acceleration, so that indicator 33 will quickly obtain its steady state position.

As previously mentioned, camera 15 also records the terrain and objects within its field of view out to the horizon. Thus, such scenes will appear on screen 41 of FIGS. 5 and 6; however, such scenes have been omitted from the figures for clarity.

As will now be recognized, a system has been disclosed which will permit an operator at a fixed ground location to effectively fly a miniature helicopter for training purposes or for surveillance or other operations in which full size helicopters are not suited. The invention provides information by a television link from the helicopter to the control position having a novel apparent wind indication system to provide wind direction before runup, to indicate whether the helicopter is flying in a straight line relative to the air passing by helicopter and to indicate a direction of flight, forward, sideways, or backwards. The magnitude of such movements can be estimated in connection with the air speed which is provided by a digital readout. Four stages of isolation are provided for the camera giving an essentially vibration-free picture. The novel directional reference pointer also provides the operator with a feel for the attitude and movement of the helicopter with respect to the ground and surrounding objects.

Although specific details of the invention have been used for exemplary purposes, it is to be understood that many modifications and variations can be made thereto without departing from the spirit and scope of the invention.

I claim:

1. A system for providing an operator at a fixed location visual information for remote control of a helicopter comprising:
   (a) a radio link from an airborne helicopter to said fixed location for transmitting video information;
   (b) a television camera disposed in the nose of said helicopter for producing video signals representative of the terrain and objects within a field of view of said helicopter;
   (c) means disposed within a field of view of said camera visually indicating relative wind direction with respect to said helicopter;
   (d) means for measuring and displaying a visual indication of forward air speed of said helicopter, said display means disposed within the field of view of said camera;
   (e) means for measuring pitch of said helicopter, said pitch measuring means including a pitch indicator disposed within the field of view of said camera; and
   (f) television receiving and display means at said fixed location for receiving said video signals and displaying video representations of terrain and objects forward of said helicopter, relative wind direction with respect to said helicopter, and air speed and pitch of said helicopter.

2. The system as recited in claim 1 which further includes:
   a reference directional pointer attached to said longitudinal structural member of said helicopter and projecting forwardly from said helicopter and within the field of view of said camera.

3. The system as recited in claim 2 which further includes:
   multiple shock mount means for said camera, said multiple shock mount means including a first isolation stage having a pair of lower isolation mounts attached to said longitudinal structural member of said helicopter;

a second isolation stage having a lower plate attached to said lower isolation mounts, an upper plate, and a foam rubber sheet attached to and disposed between said lower and upper plates;

a third isolation stage having a set of shock absorbers attached to said upper plate, said shock absorbers supporting a camera mounting plate;

a camera housing having a volume greater than the volume of said camera, said camera housing attached to said camera mounting plate by a set of resilient pads; and a foam rubber camera support disposed within said camera housing and having a cutout volume for accepting said camera.

4. The system as recited in claim 3 in which:
said wind direction indicating means includes a first wind vane pivotally mounted to an outer end of said pointer and having a vane for weathercocking to a horizontal component of air passing said vane; and a second wind vane pivoted horizontally to an outer end of said pointer and having a vane for weathercocking to a vertical component of air passing said vane, said first and second wind vanes disposed within the field of view of said camera.

5. The system as recited in claim 1 in which said airspeed measuring means includes an airspeed turbine for producing an electrical output proportional to airspeed of said helicopter.

6. The system as recited in claim 5 in which said airspeed monitoring means includes a visual readout display disposed within the field of view of said camera.

7. The system as recited in claim 6 in which said readout produces a digital display.

8. The system as recited in claim 2 in which said pitch measurement means includes:
a dynamically balanced rod longitudinally aligned with said helicopter and pivoted laterally; and a laterally oriented pointer attached to a forward end of said rod, said pointer projecting into an edge of the field of view of said camera.

9. The system as recited in claim 8 in which said rod is pivotally attached to a side of said camera housing.

10. A system for providing helicopter operation training having a miniature helicopter, a control position, a radio control link from the control position to the helicopter, and a video radio frequency link from the helicopter to the control position, comprising:

a reference indicator pointer attached to a longitudinal structural member of said helicopter and extending forwardly from a nose portion of said helicopter for providing a flight reference;

a television camera for producing video signals for transmission over said video link, said camera having a field of view forward of said helicopter and including said reference indicator pointer;

wind vane means attached to a forward end of said pointer and within said field of view of said camera for visually indicating the direction of a relative wind with respect to said helicopter;

an airspeed turbine attached to an exterior of said helicopter for producing an electrical signal proportional to the airspeed of said helicopter, said electrical signal operating a digital readout of airspeed, said readout disposed within the field of view of said camera;

a pitch indicating longitudinally-oriented balanced rod laterally pivoted to said helicopter and having a pointer at a forward end thereof projecting into the field of view of said camera; and a video display at said control position for displaying video signals received over said video link, said display including terrain forward of said helicopter, said reference indicator pointer, said wind vane means, said airspeed digital readout, and said pitch indicator pointer.

11. The system as recited in claim 10 in which said video display includes indicia for indicating degree of pitch, and horizontal and vertical components of the direction of relative wind with respect to said helicopter.

12. A method for remote control of a miniature helicopter from a fixed location, the fixed location including a radio control link to the helicopter, comprising the steps of:

providing a video camera in the helicopter having a field of view including terrain forward of the helicopter, an airspeed readout, a pitch indicator, and a relative wind direction indicator;

transmitting video signals from the camera to the fixed location, such video signals representative of the terrain forward of the helicopter, the airspeed readout, the pitch indicator, and the relative wind direction indicator;

receiving the transmitted video signals at the fixed location;

displaying a video representation of the terrain forward of the helicopter, the airspeed readout, the pitch indicator, and the relative wind direction indicator from the received video signals; and transmitting helicopter control signals from the fixed location to the helicopter.

* * * * *